(12) United States Patent
Hoffman

(10) Patent No.: US 7,635,402 B2
(45) Date of Patent: Dec. 22, 2009

(54) AIR FILTER STATUS EVALUATOR

(75) Inventor: Dan Hoffman, Farmington Hills, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 384 days.

(21) Appl. No.: 11/615,356

(22) Filed: Dec. 22, 2006

(65) Prior Publication Data

US 2008/0148947 A1    Jun. 26, 2008

(51) Int. Cl.
*B01D 46/00* (2006.01)
(52) U.S. Cl. .................. 55/385.3; 55/418; 55/385.4; 55/DIG. 34; 95/273; 96/380; 96/381; 96/382; 96/383; 96/384; 96/385; 96/386; 96/387; 96/388; 96/417; 96/421; 181/141; 181/209; 181/211; 181/284; 181/296; 116/266; 116/DIG. 25

(58) Field of Classification Search .............. 55/385.3, 55/418, 385.4, DIG. 34; 95/273; 96/380–388, 96/417, 421; 181/141, 209, 211, 284, 296; 116/266, DIG. 25
See application file for complete search history.

(56) References Cited

U.S. PATENT DOCUMENTS

| 3,716,040 | A | * | 2/1973 | Herpin | 123/198 A |
| 4,224,044 | A | * | 9/1980 | King | 55/385.1 |
| 4,445,456 | A | | 5/1984 | Nelson | |
| 4,737,083 | A | * | 4/1988 | Meyer | 417/413.1 |
| 5,850,183 | A | | 12/1998 | Berry, III | |
| 6,327,902 | B1 | | 12/2001 | Berry, III et al. | |
| 6,551,389 | B2 | * | 4/2003 | Spannbauer et al. | 96/380 |
| 6,824,591 | B2 | * | 11/2004 | Holle et al. | 95/273 |
| 2009/0007531 | A1 | * | 1/2009 | Haussner et al. | 55/495 |

FOREIGN PATENT DOCUMENTS

WO    WO 97/18027 A1    5/1997

* cited by examiner

*Primary Examiner*—Duane Smith
*Assistant Examiner*—Minh-Chau T Pham
(74) *Attorney, Agent, or Firm*—Young Basile

(57) ABSTRACT

An air filter system for an internal combustion engine of a vehicle can have an indicator for signaling restricted flow of air through a replaceable air filter member mounted to a filter assembly. At least one sidewall can be associated with the replaceable air filter member to be positioned with an air stream passing through the air filter member. A resettable air filter status indicator can provide a visually perceivable signal external of the filter assembly. The resettable air filter status indicator can be integrally formed in the sidewall for indicating if a mounted air filter member requires replacement in response to air intake differential pressure with respect to atmospheric pressure on a downstream side of air flow through the replaceable filter member being above a predetermined threshold value.

18 Claims, 4 Drawing Sheets

AIR FILTER STATUS EVALUATOR

FIELD OF THE INVENTION

The present invention relates an air filter status evaluator for monitoring the air filter performance for an internal combustion engine of a vehicle, and more particularly a low cost, simplified, air filter status indicator providing a visually perceivable signal external of the air filter housing for indicating if the air filter member requires replacement.

BACKGROUND

Air filter restriction indicating devices are known from, for example, U.S. Pat. No. 4,445,456; U.S. Pat. No. 5,850,283; U.S. Pat. No, 6,327,902; and PCT International Publication Number WO-97/18027. While these devices appear to be suitable for their intended purpose, it would be desirable to provide a device which is mechanically simpler, less costly to manufacture, and/or more easily integrated into existing air filter housing side walls.

SUMMARY

An air filter status evaluator for a vehicle can include a housing having at least one sidewall associated with a replaceable air filter member to be positioned with an air stream passing through air filter member. An air filter status indicator can provide a visually perceivable signal external of the housing for indicating if the air filter member requires replacement.

An air filter system for a vehicle can have an indicator for signaling restricted flow of air through a replaceable air filter member mounted to a filter assembly. The indicator can include at least one sidewall to be associated with a replaceable air filter member to be positioned with an airstream passing through the air filter member. The resettable air filter status indicator can provide a visually perceivable signal external of the filter assembly. The resettable air filter status indicator can be integrally formed in the sidewall for signaling if a mounted air filter member requires replacement.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
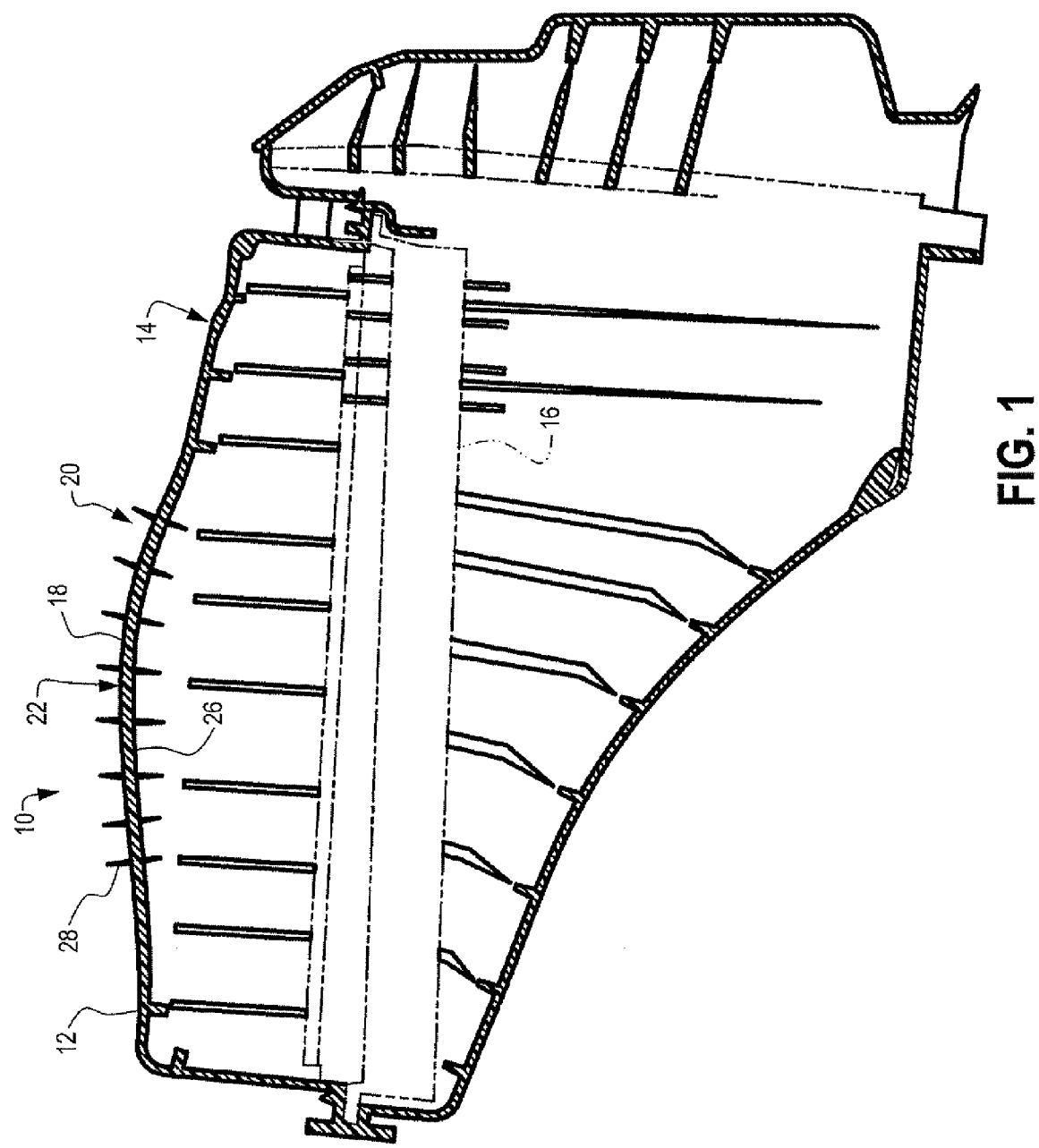
FIG. 1 is a simplified cross-sectional view of a filter element type housing including an air filter status indicator according to an embodiment of the present invention.

Referring now to FIGS. 1-4, an air filter status evaluator 10 for a vehicle can include at least one sidewall 12 of an air box or housing 14 associated with a replaceable air filter member 16. The replaceable air filter member 16 can be positioned with an air stream passing through the air filter member 16 for the air intake of an internal combustion engine of a vehicle. An air filter status indicator 20 provides a visually perceivable signal external of the housing 14 for indicating if the air filter member 16 requires replacement. The air filter status indicator 20 can include at least a portion 26 of the sidewall 12 movable between a first position 22 and a second position 24 in response to changes in air intake pressure differential with respect to atmospheric pressure on a downstream side of air flow across the replaceable air filter member 16. One of the first and second positions 22, 24 can correspond to an acceptable air filter member status, while the other of the first and second positions 22, 24 corresponds to an air filter member status requiring replacement. The air filter status indicator 20 can be integrally formed as a movable portion 26 of the sidewall 12 of the housing 14. The movable portion 26 of the sidewall 12 is in an extended position 22 when a pressure differential with respect to atmospheric pressure on a downstream side of the replaceable air filter member 16 is lower than a predetermined threshold criteria or value. The movable portion 26 of the sidewall is in a retracted position, when the pressure differential with respect to atmospheric pressure on a downstream side of the replaceable air filter member 16 is higher than a predetermined threshold value or criteria. In other words, as the air intake pressure on a downstream side of the replaceable air filter member 16 becomes lower than atmospheric pressure by predetermined threshold criteria, the movable portion 26 of the sidewall 12 of the housing 14 will move from the extended position 22 to the retracted position 24 in order to provide a visually perceivable signal for the vehicle operator, or maintenance personnel, to indicate that the air filter element 16 requires replacement. The material and/or structural configuration of the movable portion 26 of the sidewall 12 of the housing 14 is selected in order to provide a stable first position 22 and stable second position 24, so that once the movable portion 26 has transitioned from the first or extended position 22 to the second or retracted position 24, the portion 26 remains in that position until manually reset by the vehicle operator or maintenance personnel. The air filter status indicator 20 can include at least some contoured portions 28 of sufficient size and shape to releasibly hold at least the movable 26 of the sidewall 12 in the first position 22 corresponding to an acceptable air filter member status when the pressure differential with respect to atmospheric pressure on a downstream side of the replaceable air filter member 16 is less than a predetermined threshold criteria or value. The contoured portions 28 can allow manually reversible flexing movement of the movable portion 16 of the sidewall 12 to the second position 24 corresponding to an air filter member status requiring replacement in response to an air intake differential pressure with respect to atmospheric pressure being above a predetermined threshold criteria or value on a downstream side of the air filter member 16. The contoured portions 28 can include ridges, grooves, ribs, varying wall thicknesses, varying material, compositions, or any combination thereof in order to provide stable first and second positions 22, 24 while allowing flexing movement between the first position to the second position in response to the air intake differential pressure with respect to atmospheric pressure being above a predetermined threshold value on a downstream side of the air filter member 16. The contoured portions further allowing manually reversible flexing movement of the movable portion 26 from the second position 24 to the first position 22 by the vehicle owner, or maintenance personnel, as desired when replacement of the air filter member 16 has been accomplished.

Figure 2:
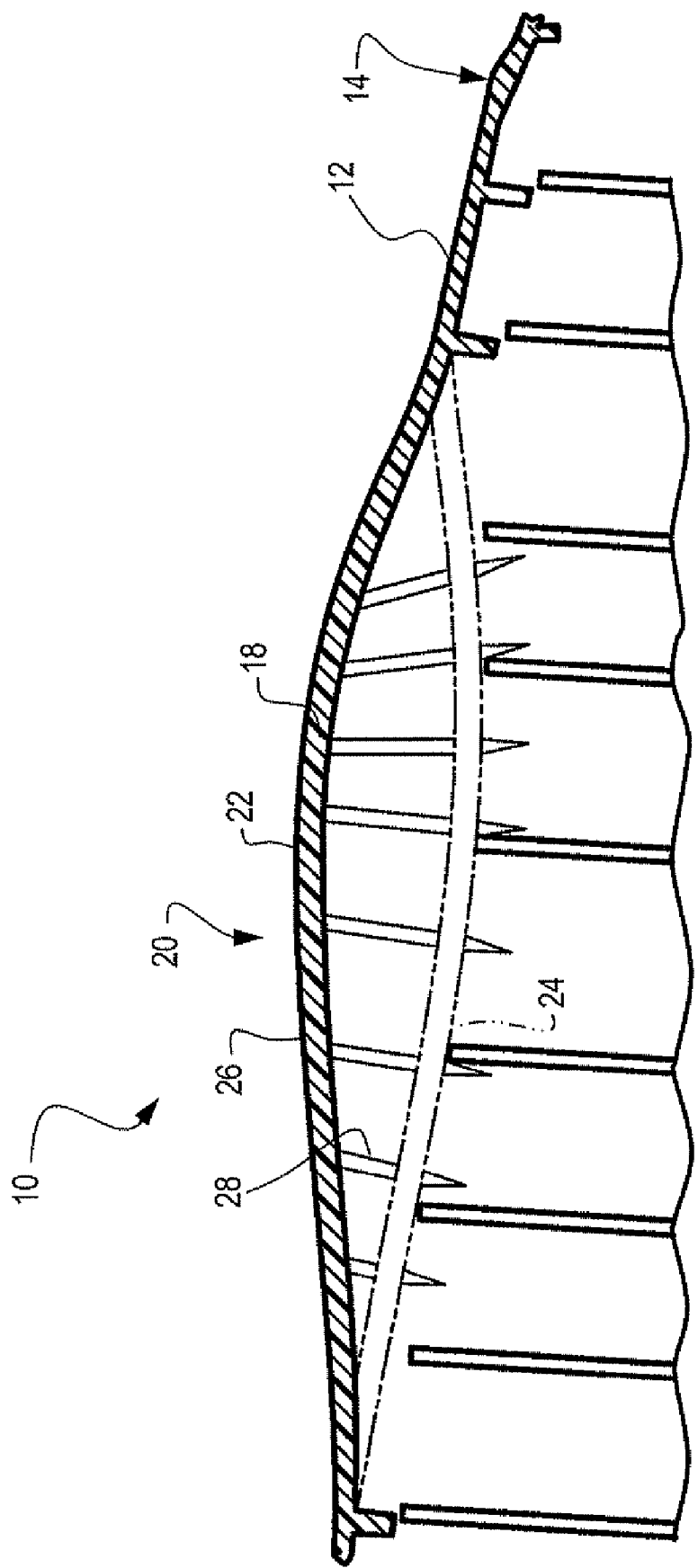
FIG. 2 is a detailed cross sectional view of an air filter status indicator according to an embodiment of the present invention illustrating a first position, shown in solid line, corresponding to an acceptable air filter member status, and illustrating a second position, shown in phantom line, corresponding to an air filter member status requiring replacement.

Referring now to FIG. 2, the movable portion 26 of the sidewall 12, by way of example and not limitation, can be a convex configuration, as shown in solid line, when corresponding to an acceptable air filter member status. When the air intake differential pressure with respect to atmospheric pressure rises above a predetermined threshold criteria or value on a downstream side of the air filter member 16, the movable portion 26 of the sidewall 12 can move or flex to be in a concave configuration, as illustrated in phantom line, for signaling an air filter status requiring replacement. The air filter status indicator 20 can be defined by a diaphragm spring 18. The diaphragm spring 18 can be integrated into the movable portion 26 of the sidewall 12 of the housing 14. The diaphragm spring 18 is responsive to air intake differential pressure with respect to atmospheric pressure on a downstream side of the air filter member 16.

Figure 3:
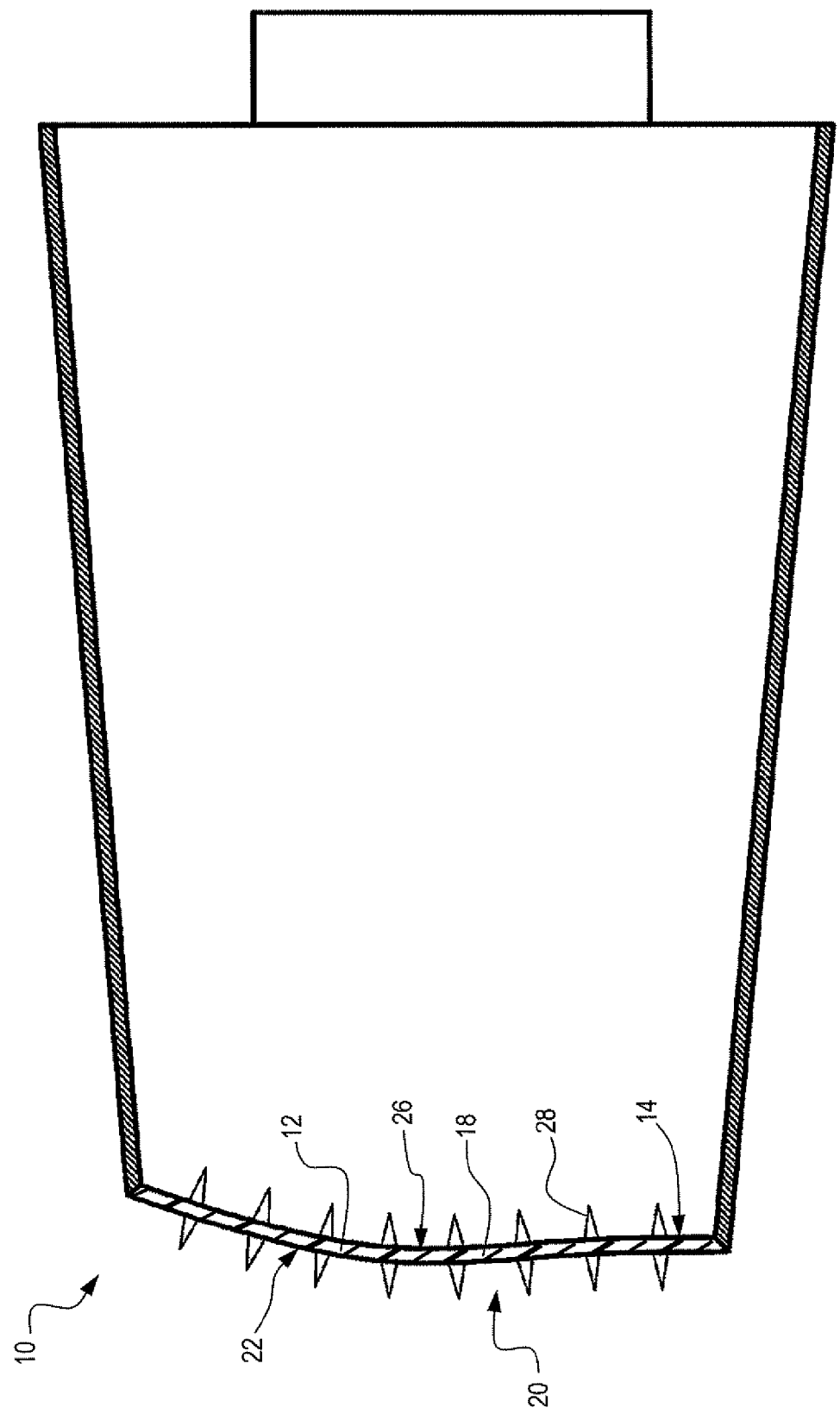
FIG. 3 is a simplified cross-sectional view of an open type filter and end housing cover according to an embodiment of the present invention.

The housing 14 at least partially encloses the air filter member 16 as illustrated in FIGS. 1 and 3. As best seen in FIG. 1, the replaceable air filter member 16 can be a filter-element type housing. Or as best seen in FIG. 3, the replaceable air filter member 16 can be an open-type air filter and housing. In any case, at least one sidewall 12 of housing 14 is provided to at least partially enclose the filter member 16.

Figure 4:
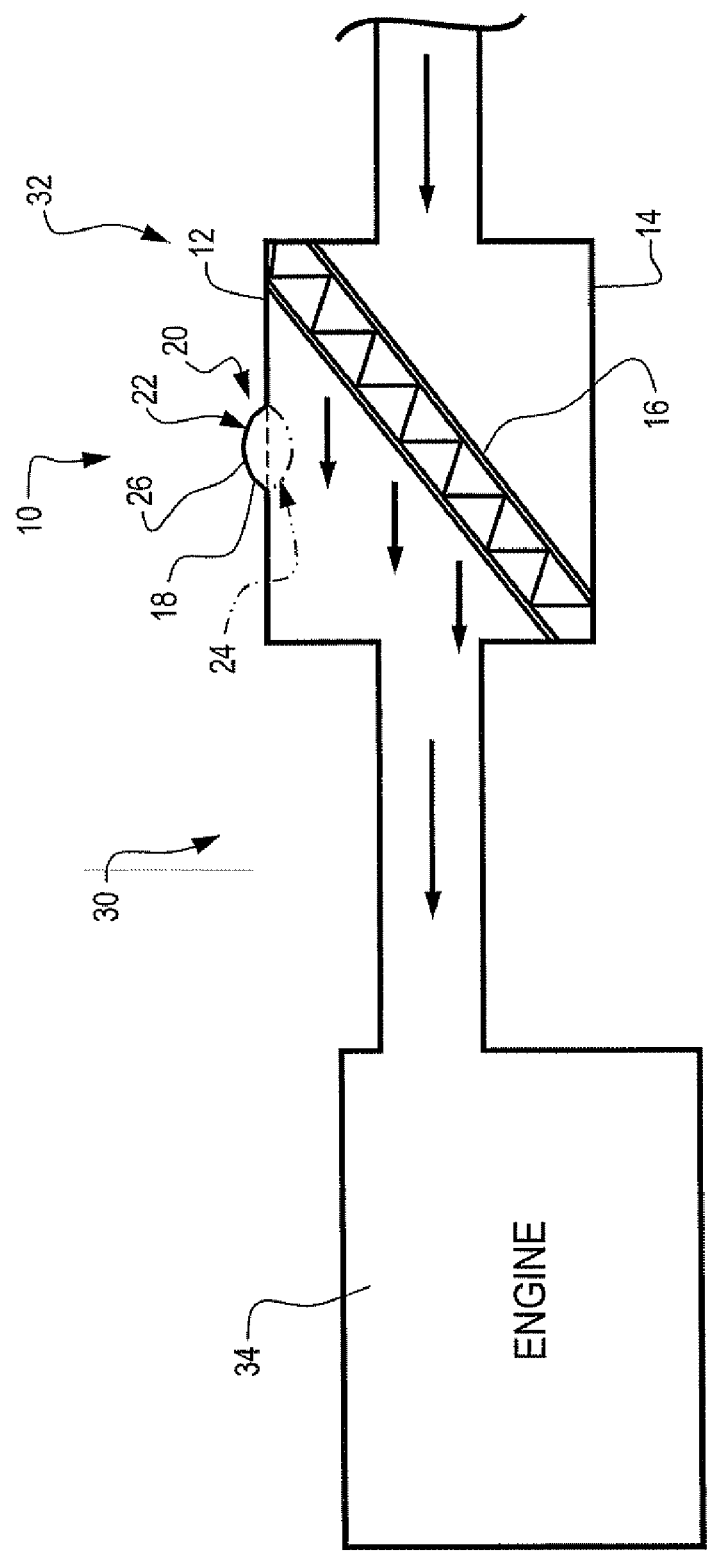
FIG. 4 is simplified schematic view of an air filter system for an internal combustion engine of a vehicle including an indicator for signaling restricted flow of air through a replaceable air filter member mounted to a filter assembly according to an embodiment of the present invention.

Referring now to FIG. 4, an air filter system 30 for an internal combustion engine 34 of a vehicle can have an indicator 20 for signaling restricted flow of air through a replaceable air filter member 16 mounted to a filter assembly 32. At least one sidewall 12 can be associated with a replaceable air filter member 16 to be positioned with an air stream passing through the air filter member 16. A resettable air filter status indicator 20 can provide a visually perceivable signal external of the filter assembly 32. The resettable air filter status indicator 20 can be an integrally formed in at least one sidewall 12 for indicating if an air filter member 16 requires a replacement.

At a least a portion 26 of the sidewall 12 can be movable between a first position 22 and second position 24 in response to changes in air intake differential pressure with respect to atmospheric pressure on a downstream side of air flow through the air filter member 16. One of the first and second positions 22,24 can correspond to an acceptable air filter member status, while the other of the first and second positions 22, 24 corresponds to an air filter member status requiring replacement. As illustrated, the portion 26 of the sidewall 12 is in a protruding configuration when signaling an acceptable air filter member status. The portion 26 of the sidewall 12 as illustrated is in a receding or retracted configuration when signaling an air filter member status requiring replacement. The air filter status indicator 20 can be a diaphragm spring 18 integrated into the sidewall 12 for movement in response to air intake differential pressure with respect to atmospheric pressure on a downstream side of the air filter member 16.

The air filter status indicator 20 can be integrally formed as at least a movable portion 26 of at least one sidewall 12 of the housing 14. The movable portion 26 of the sidewall 12 can be in an extended position 22 when differential pressure on a downstream side of the replaceable air filter member 16 is lower than a predetermined threshold value. The movable portion 26 of the sidewall 12 can be in retracted positioned 24 when differential pressure on a downstream side of the replaceable filter member 16 is higher than the predetermined threshold value. The air filter status indicator 20 defines a device having means to convey information to one of the senses of the vehicle operator or maintenance personnel. The air filter status indicator 20 is caused to move by the differential pressure force between the air intake pressure on one side of the diaphragm and atmospheric pressure on an opposite side of the diaphragm located on a downstream side with respect to air flow through the replaceable air filter member 16. The air filter status indicator 20 includes means responsive to the force of the fluid differential pressure to cause the movable portion 16 of the sidewall 12 of the housing 14 to move providing a visually perceivable signal indicating replacement of the air filter member is required. The indicator 20 is responsive to fluid forces, i.e. air intake pressure acting on one side while atmospheric pressure acts on the other side, that are not the same. The fluid forces act on the air filter status indicator 20 at all times that the internal combustion engine 34 of the vehicle is operating. The indicator 20 senses the differential pressure drop changes in the replaceable air filter member 16, which is an indication of the flow and resistance to flow through the replaceable air filter member 16.

The air filter status indicator 20 can include at least some contoured portions 28 of sufficient size and shape to releasibly hold at least the removable portion 26 of the sidewall 12 in a first position 22 corresponding to an acceptable air filter member status, while allowing manually reversible flexing movement of the movable portion 26 of the sidewall 12 to second position 24 corresponding to air filter member status requiring replacement in response to air intake differential pressure with respect to atmospheric pressure being above a predetermined threshold criteria or value on a downstream side of the air filter member 16. The replaceable air filter member 16 can be a filter-element type housing as illustrated in FIG. 1, or an open-type air filter as illustrated in FIG. 3. In either case, at least one sidewall 12 partially encloses the replaceable air filter member 16.

The air filter status indicator 20 according to an embodiment of the present invention provides a movable portion 26, by way of example and not limitation, such as a diaphragm spring 18 in an air box or housing 14 for a replaceable air filter member 16. The air filter status indicator 20 can be provided as an additional feature not currently offered on an internal combustion engine applications, the air filter status indicator 20 provides cost savings by combining the function of more mechanically complicated previously known pressure differential gages into an extremely simple configuration integrally formed in a housing or cover, having a sidewall to be associated with the replaceable air filter member 16. The air filter status indicator 20 is simple to incorporate into current air box housings with little or no additional cost. The air filter status indicator illustrates the quality of the air filter member 16 installed on an internal combustion engine 34 of a vehicle by monitoring pressure differential drop across the air filter member 16. The pressure differential drop across the air filter member 16 is measured or monitored by a movable portion 26 of the sidewall 12, such a diaphragm spring 18 integrated into the filter housing or cover 14. The air filter status indicator 20 can be used on both filter-element type housings and open-type air filter configurations.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An air filter status evaluator for a vehicle comprising:
a housing having at least one sidewall; and
a replaceable air filter member adjacent the at least one sidewall and positioned with an air stream passing through the air filter member, wherein a portion of the sidewall downstream of the replaceable air filter member is an air filter status indicator configured to provide a visually perceivable signal external of the housing that indicates if the air filter member requires replacement,
wherein the air filter status indicator includes at least some contoured portions of sufficient size and shape to releasably hold at least a moveable portion of the sidewall in a first position corresponding to an acceptable air filter member status, and allowing manually reversible flexing movement of the portion of the sidewall to a second position corresponding to an air filter member status requiring replacement in response to air intake pressure differential with respect to atmospheric pressure being above a predetermined value on a downstream side of the air filter member.

2. The air filter status evaluator of claim 1, wherein the air filter status indicator has a first position and a second position, the air filter status indicator configured to move between the first position and the second position in response to changes in air intake pressure differential with respect to atmospheric pressure on a downstream side of air flow across the replaceable filter member, wherein one of the first and second positions corresponds to an acceptable air filter member status and the other of the first and second positions corresponds to an air filter member status requiring replacement.

3. The air filter status evaluator of claim 2, wherein the portion of the sidewall is in a convex configuration when corresponding to an acceptable air filter member status.

4. The air filter status evaluator of claim 2, wherein the portion of the sidewall is in a concave configuration when corresponding to an air filter member status requiring replacement.

5. The air filter status evaluator of claim 1, wherein the air filter status indicator is a diaphragm spring integrated into the at least one sidewall of the housing, the diaphragm spring responsive to air intake pressure differential with respect to atmospheric pressure on a downstream side of the air filter member.

6. The air filter status evaluator of claim 1, wherein the replaceable air filter member is planar.

7. The air filter status evaluator of claim 1, wherein the replaceable air filter member is annular.

8. The air filter status evaluator of claim 1, wherein the air filter status indicator is integrally formed as at least a moveable portion of the sidewall of the housing, and the moveable portion of the sidewall is in an extended position when differential pressure with respect to atmospheric pressure on a downstream side of the replaceable air filter member is lower than a predetermined value, and the moveable portion of the sidewall is in a retracted position when differential pressure with respect to atmospheric pressure on a downstream side of the replaceable air filter member is higher than the predetermined value.

9. The air filter status evaluator of claim 1, wherein the at least one sidewall comprises a continuous surface.

10. In an air filter system for a vehicle having an indicator for signaling restricted flow of air through a replaceable air filter member mounted to a filter assembly, the improvement comprising:
at least one sidewall to be associated with a replaceable air filter member positioned with an air stream passing through the air filter member; and
a resettable air filter status indicator providing a visually perceivable signal external of the filter assembly and integrally formed in the at least one sidewall downstream of the replaceable air filter member for indicating if the air filter member requires replacement,
wherein the air filter status indicator includes at least some contoured portions of sufficient size and shape to releasably hold at least a moveable portion of the sidewall in a first position corresponding to an acceptable air filter member status, and allowing manually reversible flexing movement of the moveable portion of the sidewall to a second position corresponding to an air filter member status requiring replacement in response to air intake differential pressure with respect to atmospheric pressure being above a predetermined value on a downstream side of the air filter member.

11. The improvement of claim 10, wherein the air filter status indicator further comprises:
at least a portion of the sidewall movable between a first position and a second position in response to changes in air intake pressure differential with respect to atmospheric pressure on a downstream side of air flow through the air filter member, wherein one of the first and second positions corresponds to an acceptable air filter member status and the other of the first and second positions corresponds to an air filter member status requiring replacement.

12. The improvement of claim 11, wherein the portion of the sidewall is in a protruding configuration when corresponding to an acceptable air filter member status.

13. The improvement of claim 11, wherein the portion of the sidewall is in a receding configuration when corresponding to an air filter member status requiring replacement.

14. The improvement of claim 10, wherein the air filter status indicator is a diaphragm spring integrated into the at least one sidewall and moveable responsively to changes in air intake pressure differential with respect to atmospheric pressure on a downstream side of the air filter member.

15. The improvement of claim 10, wherein the replaceable air filter member is planar.

16. The improvement of claim 10, wherein the replaceable air filter member is annular.

17. The improvement of claim 10, wherein the air filter status indicator is integrally formed as at least a moveable portion of the at least one sidewall, and the moveable portion of the sidewall is in an extended position when differential pressure with respect to atmospheric pressure on a downstream side of the replaceable air filter member is lower than a predetermined value, and the moveable portion of the sidewall is in a retracted position when differential pressure with respect to atmospheric pressure on a downstream side of the replaceable air filter member is higher than the predetermined value.

18. The improvement of claim 10, wherein the at least one sidewall comprises a continuous surface.

* * * * *